(12) United States Patent
Ishikawa

(10) Patent No.: US 6,305,430 B1
(45) Date of Patent: Oct. 23, 2001

(54) REINFORCEMENT STRUCTURE FOR PIPE

(75) Inventor: Masahiro Ishikawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/766,057

(22) Filed: Jan. 18, 2001

(30) Foreign Application Priority Data

Jan. 20, 2000 (JP) .................................................. 12-012278

(51) Int. Cl.⁷ ........................................................ F16L 9/14
(52) U.S. Cl. .......................... 138/174; 138/172; 138/178; 138/153
(58) Field of Search .................................. 138/174, 172, 138/153, 177, 112, 113, 114

(56) References Cited

U.S. PATENT DOCUMENTS

| | | | |
|---|---|---|---|
| 5,573,040 | * 11/1996 | Schumacher et al. | 138/172 X |
| 5,579,809 | * 12/1996 | Millward et al. | 138/174 |
| 6,035,900 | * 3/2000 | Ellis | 138/174 |

FOREIGN PATENT DOCUMENTS 8-2289 1/1996 (JP) .

* cited by examiner

Primary Examiner—Patrick Brinson
(74) Attorney, Agent, or Firm—Skjerven Morrill MacPherson LLP; Alan H. MacPherson

(57) ABSTRACT

A reinforcement structure of pipe comprises a hard resin to be inserted into a pipe portion to be reinforced and protruded members protruded from the hard resin and having a slightly larger diameter than an inside diameter of the pipe portion, the protruded members being formed of a foaming resin material and the protruded members pressed into the pipe portion being foamed and expanded to seal between an internal surface of said pipe and an external surface of at least one of said core member.

6 Claims, 14 Drawing Sheets

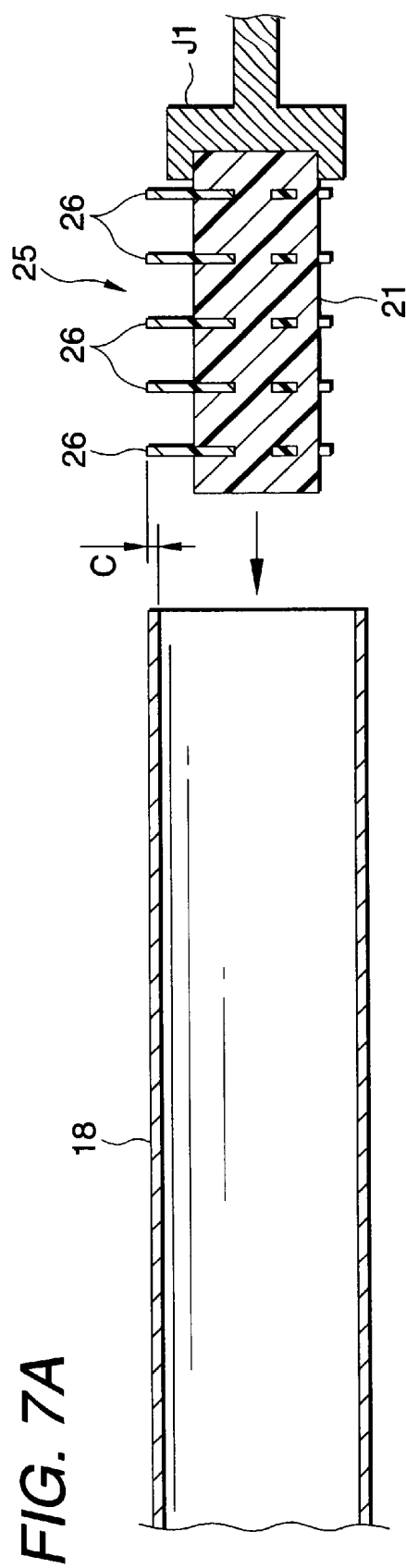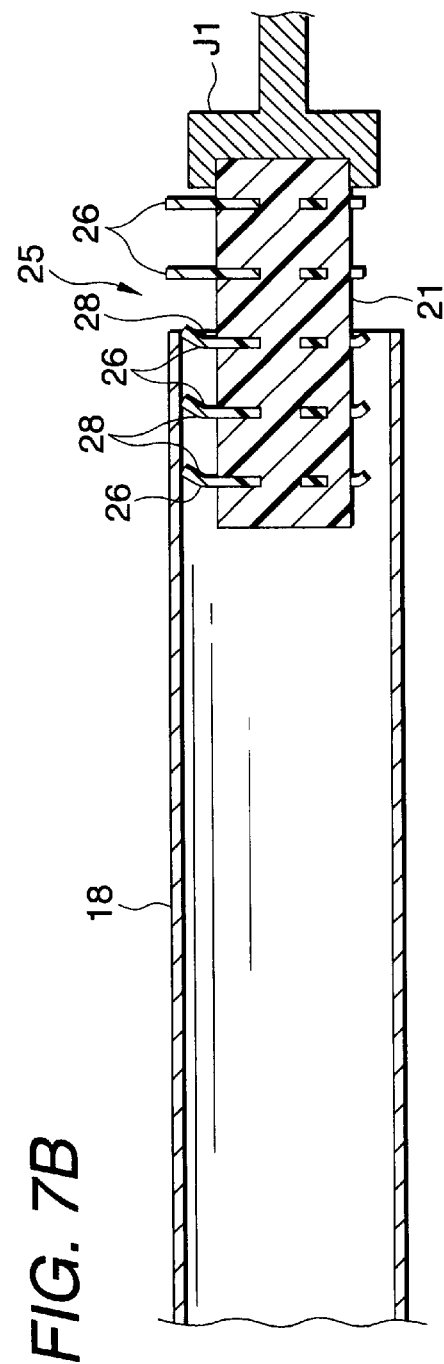
FIG. 7A
FIG. 7B

REINFORCEMENT STRUCTURE FOR PIPE

BACKGROUND OF THE INVENTION

1. Field of the Invention

The present invention relates to a reinforcement structure of a pipe which is suitable for fixing a reinforcement member such as a resin material into a pipe.

2. Description of the Related Art

As a structure for reinforcing a closed sectional structure, for example, there have been known (1) a structure having a resin material inserted therein and (2) a structure described in Japanese Patent Unexamined Publication No. Hei.8-2289 (JP-A-8-2289) "Instrument Panel Reinforcement and Instrument Panel Reinforcement Manufacturing Method".

The art (1) will be below.

FIG. 15 is an exploded perspective view showing a conventional reinforcement structure of a closed sectional structure.

A center pillar 100 to be the closed sectional structure serves to interpose a stiffener 103 between an inner panel 101 and an outer panel 102. In order to reinforce the center pillar 100, a resin material 104 for reinforcement is provided between the inner panel 101 and the stiffener 103. The reference numerals 105 and 105 denote a fixing hole for fixing the resin material 104 to the inner panel 101.

FIG. 16 is a sectional view showing a conventional center pillar. The resin material 104 is constituted by a hard resin 106 to be a core member and a foaming resin material 107 fixed to an external surface of the hard resin 106, and clip portions 108 and 108 are provided on the hard resin 106 and are coupled to the fixing holes 105 and 105 of the inner panel 101. Consequently, the resin material 104 is fixed into the center pillar 100.

FIG. 17 is a view illustrating a state in which the conventional center pillar is reinforced. In this state, the foaming resin material 107 (see FIG. 16) is foamed and a foaming resin 111 is filled between the inner panel 101 and the stiffener 103.

Moreover, the art (2) has described an instrument panel reinforcement 10 in which flanges 20, 22, 24 and 26 protruded from an external surface are provided in a pipe-shaped large diameter portion 14, a pipe-shaped small diameter portion 16 is inserted into the large diameter portion 14 and the large diameter portion 14 and the small diameter portion 16 are welded through welding holes 36 and 38 opened on the large diameter portion 14 in order to enhance a strength of an instrument panel of an automobile as shown in FIG. 2.

In the art (1), the resin material 104 can be fixed into the center pillar 100 comparatively easily. In the case in which the art (1) is to be applied to the art (2), the clip portion for fixing a resin material into a fixing hole opened on the small diameter portion 16 requires a special shape, for example. Consequently, a cost is increased. Furthermore, in the case in which the pipe-shaped small diameter portion 16 is elongated, the clip portion for the resin material which is inserted into the small diameter portion 16 should be aligned with the fixing hole in the small diameter portion 16 at an end of the small diameter portion 16. Therefore, a fixing work is hard to perform.

SUMMARY OF THE INVENTION

It is an object of the invention to provide a reinforcement structure of a pipe which can easily fix a reinforcement member such as a resin material into a pipe.

In order to achieve the object, a first aspect of the invention is directed to a reinforcement structure of a pipe comprising a core member to be inserted into a pipe to be reinforced and a protruded member protruded from the core member and having a slightly larger diameter than an inside diameter of the pipe, wherein one of the core member and the protruded member is formed of a foaming resin material and the core member or protruded member pressed into the pipe is foamed and expanded, thereby sealing an internal surface of the pipe and an external surface of the core member or that of the protruded member.

The protruded member has a slightly larger diameter than the inside diameter of the pipe. Consequently, the protruded member is pressed into the pipe together with the core member so that the core member and the protruded member are fixed into optional positions in the pipe.

Thus, the core member and the protruded member can easily be fixed into the pipe so that a workability can be enhanced.

Moreover, it is not necessary to use the fixing hole and the clip portion which serve to fix the core member and the protruded member into the pipe. Consequently, it is possible to reduce a cost for processing a pipe and a cost of a material.

A second aspect of the invention is directed to the reinforcement structure of a pipe, wherein the core member and the protruded member are formed of the same foaming resin material integrally.

The core member and the protruded member are formed of the same foaming resin material integrally. Thus, an integral product of the core member and the protruded member can easily be formed.

Accordingly, a manufacturing cost of the integral product can be reduced.

BRIEF DESCRIPTION OF THE DRAWINGS

FIGS. 7A and 7B are first functional views illustrating the procedure for fixing the reinforcement element forming the reinforcement structure of a pipe according to the invention (the first embodiment)

DETAILED DESCRIPTION OF THE PREFERRED EMBODIMENT

Figure 1:
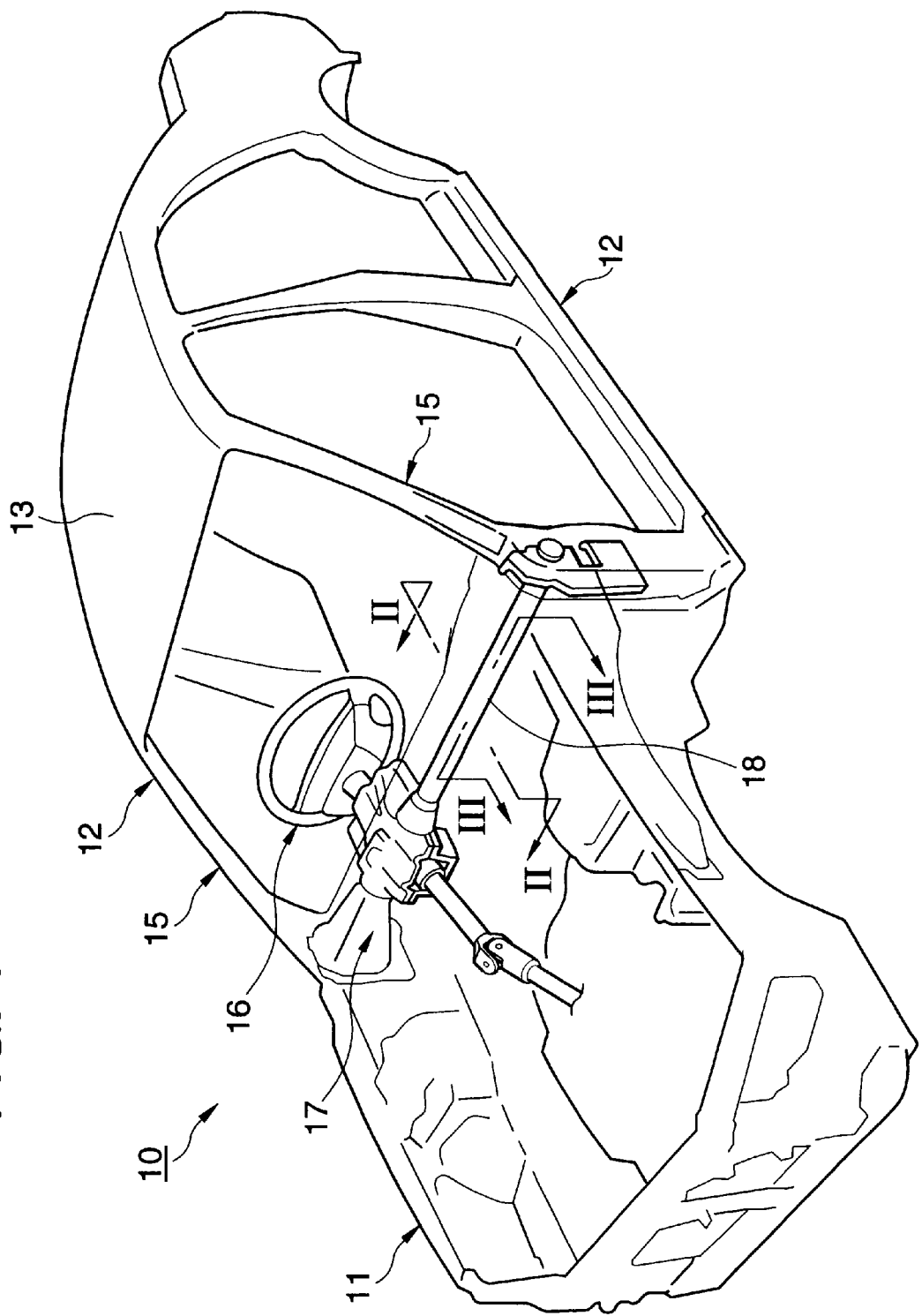
FIG. 1 is a perspective view showing a body employing a reinforcement structure of a pipe according to the invention.

An embodiment of the invention will be described below with reference to the accompanying drawings. The drawings are to be seen in a direction of the reference numerals.

FIG. 1 is a perspective view showing a body employing a reinforcement structure of a pipe according to the invention. A body 10 comprises a front body 11 for accommodating an engine, side bodies 12 and 12 extended rearward from both side portions of the front body 11 and a roof 13 provided across the side bodies 12 and 12. The side bodies 12 and 12 are provided with front pillars 15 and 15 in front portions thereof, and a steering hanger beam 17 for attaching a steering handle device 16 is provided between lower portions of the front pillars 15 and 15. The reference numeral 18 denotes a pipe portion to be a pipe of the steering hanger beam 17.

Figure 2:
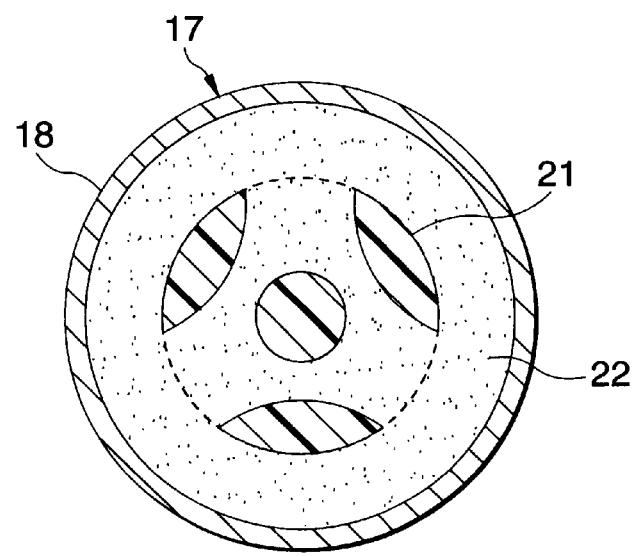
FIG. 2 is a sectional view taken along the line 2—2 of FIG. 1 (a first embodiment of the reinforcement structure of a pipe according to the invention)

FIG. 2 is a sectional view taken along the line 2—2 of FIG. 1 (a first embodiment of a reinforcement structure of a pipe according to the invention), illustrating a state in which a hard resin 21 to be a core member for reinforcement is inserted into a cylindrical pipe portion 18 and a foaming resin 22 is filled in the pipe portion 18 excluding the hard resin 21. The foaming resin 22 is obtained by foaming a foaming resin material buried integrally in the hard resin 21 (which will be described below).

Figure 3:
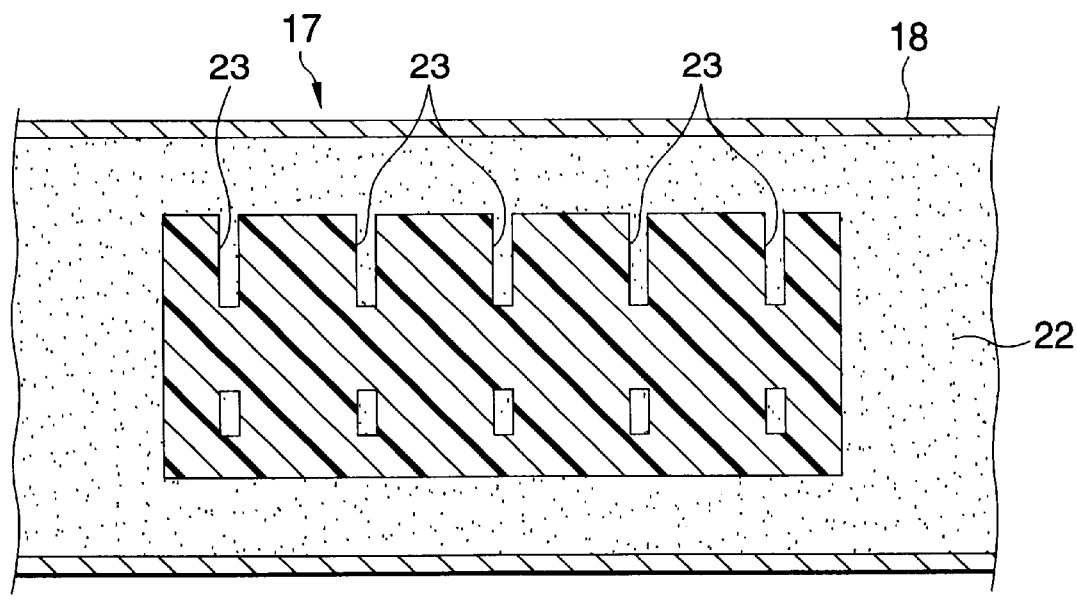
FIG. 3 is a sectional view taken along the line 3—3 of FIG. 1 (the first embodiment)

FIG. 3 is a sectional view taken along the line 3—3 of FIG. 1 (the first embodiment), in which the hard resin 21 inserted in the pipe portion 18 is a cylindrical member and includes a plurality of voids 23 . . . (". . . " denotes a plural, it is similar hereinafter.) having a shape corresponding to a portion where the foaming resin material is buried.

Figure 4:
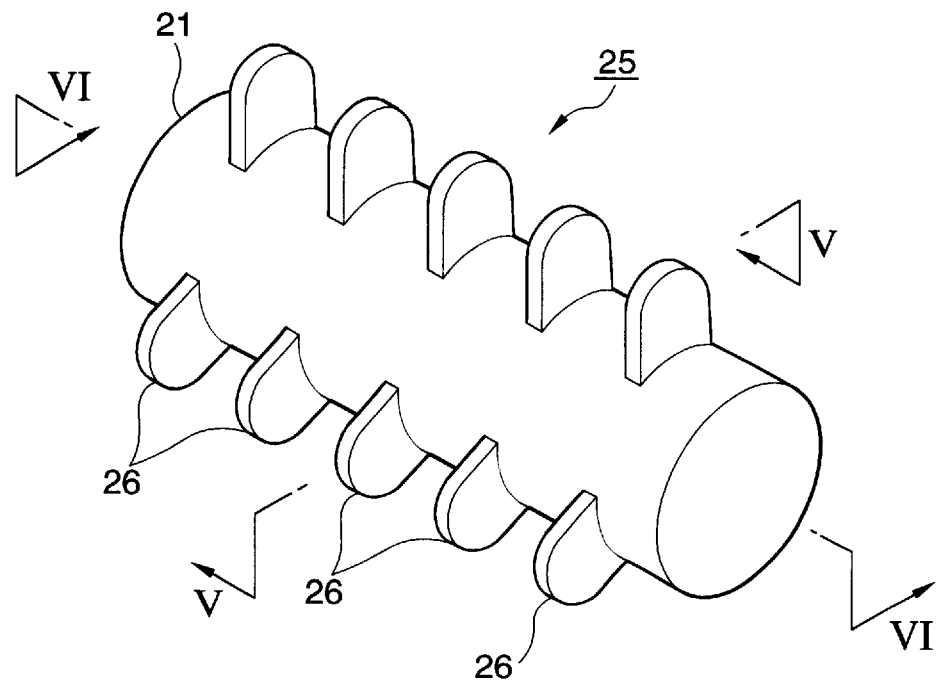
FIG. 4 is a perspective view showing a reinforcement element forming the reinforcement structure of a pipe according to the invention (the first embodiment)

FIG. 4 is a perspective view showing a reinforcement element forming the reinforcement structure of a pipe according to the invention (the first embodiment), in which a reinforcement element 25 to be inserted into a pipe member includes the hard resin 21 and protruded members 26 buried integrally in the hard resin 21 and protruded from an external surface of the hard resin 21, and the protruded members 26 are formed of a foaming resin material.

The foaming resin material has such a property as to be foamed at an ordinary temperature or by heat. In the states shown in FIGS. 2 and 3, the reinforcement element 25 is inserted into the pipe portion 18 and the protruded members 26 are then foamed.

Figure 5:
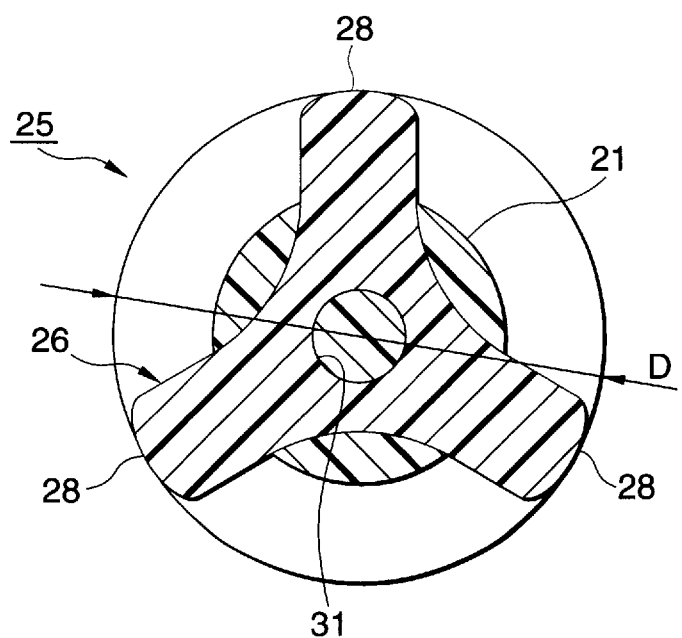
FIG. 5 is a sectional view taken along the line 5—5 of FIG. 4 (the first embodiment)
Figure 6:
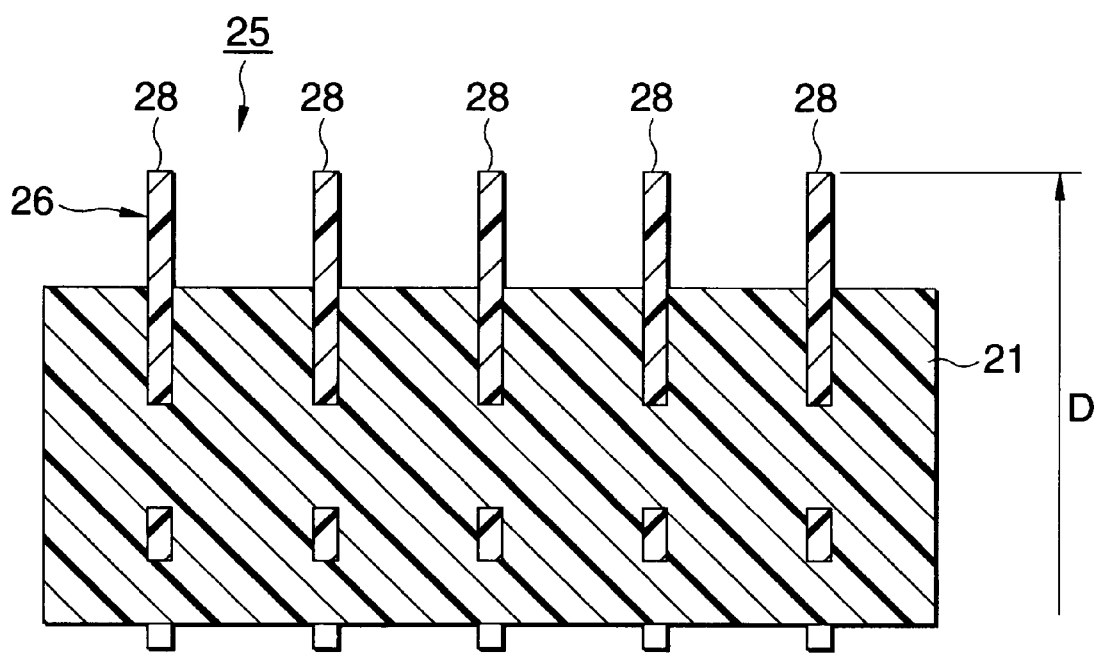
FIG. 6 is a sectional view taken along the line 6—6 of FIG. 4 (the first embodiment)

FIG. 5 is a sectional view taken along the line 5—5 of FIG. 4 (the first embodiment), illustrating a state in which three protruded portions 28 are formed in the hard resin 21 and a protruded member 26 having a through hole 31 opened on a center is buried. FIG. 6 is a sectional view taken along the line 6—6 of FIG. 4 (the first embodiment). The protruded member 26 is plate-shaped and has elasticity. The protruded member 26 of the reinforcement element 25 has an outside diameter D which is larger than an inside diameter of the pipe portion 18 (see FIG. 3).

The procedure for fixing the reinforcement element 25 into the pipe portion 18 will be described below.

FIGS. 7A and 7B are first functional views illustrating the procedure for fixing the reinforcement element forming the reinforcement structure of a pipe according to the invention (the first embodiment).

In FIG. 7A, a difference between the outside diameter of the protruded member 26 and the inside diameter of the pipe portion 18 is set to C on one of sides.

First of all, the reinforcement element 25 is inserted from the end side of the pipe portion 18 by means of a jig J1.

FIG. 7B shows a state in which the reinforcement element 25 is being inserted from the end of the pipe portion 18.

The outside diameter of the protruded member 26 is larger than the inside diameter of the pipe portion 18. Therefore, the reinforcement element 25 is pressed into the pipe portion 18. Consequently, the protruded members 26 . . . thus pressed are flexed to push an internal surface of the pipe portion 18 by elastic force, respectively.

Figure 8A:
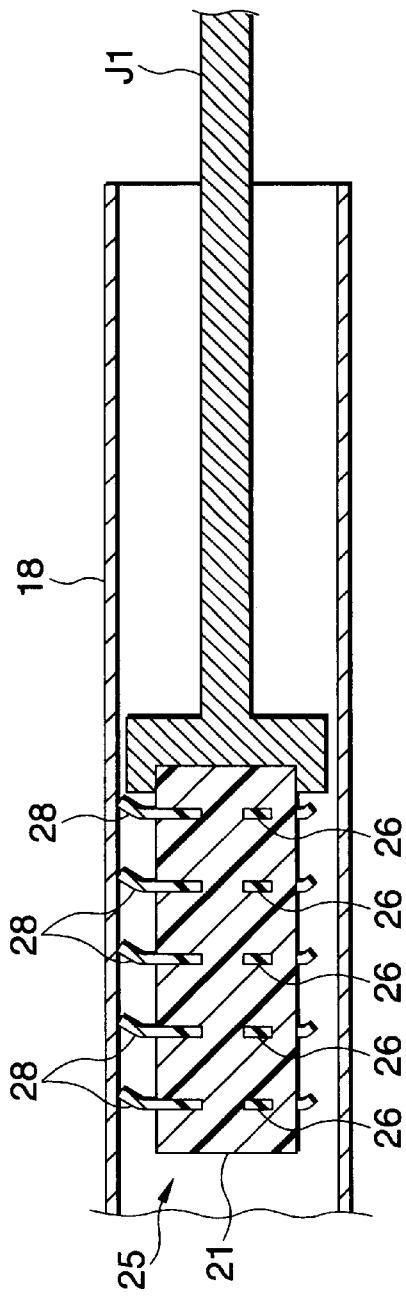
FIGS. 8A and 8B are second functional views illustrating the procedure for fixing the reinforcement element forming the reinforcement structure of a pipe according to the invention (the first embodiment)
Figure 8B:
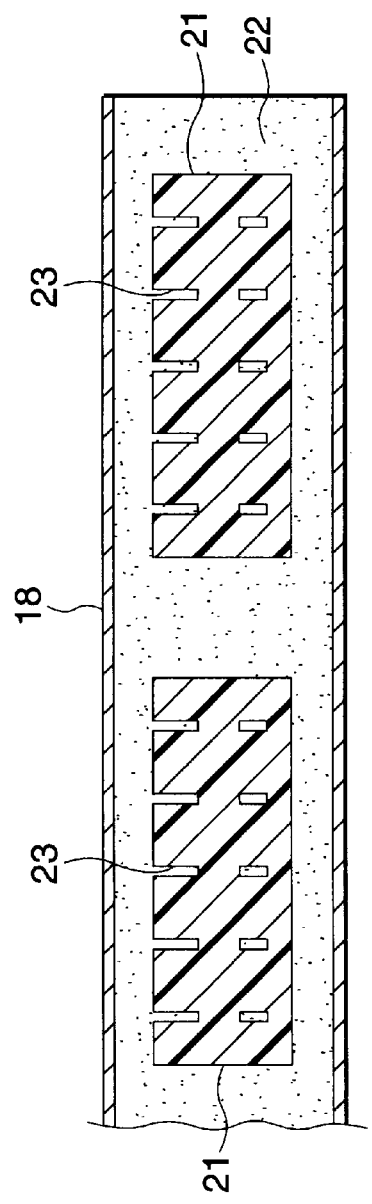

FIGS. 8A and 8B are second functional views illustrating the procedure for fixing the reinforcement element forming the reinforcement structure of a pipe according to the invention (the first embodiment).

In FIG. 8A, the reinforcement element 25 is moved to a predetermined position in the pipe portion 18 by means of a jig J1.

As described above, the protruded members 26 . . . have elastic force and frictional force is generated between the internal surface of the pipe portion 18 and the respective protruded portions 28 . . . of the protruded members 26 . . . Therefore, when the reinforcement element 25 is simply moved to the predetermined position, the reinforcement element 25 can easily be fixed into the same predetermined position.

FIG. 8B illustrates a state in which a plurality of reinforcement elements 25 (see (a)) are fixed into the pipe portion 18 and the protruded members 26 are then foamed by applying heat from the outside of the pipe portion 18, thereby forming the foaming resin 22, for example, and the inside of the pipe portion 18 is thus filled with the hard resins 21 and the cured foam resin 22.

Consequently, the pipe portion 18 can easily be reinforced.

As described with reference to FIGS. 8A and 8B, the invention provides a reinforcement structure of a pipe comprising a hard resin 21 to be inserted into a pipe portion 18 to be reinforced and protruded members 26 protruded from the hard resin 21 and having a slightly larger diameter than an inside diameter of the pipe portion 18, wherein the protruded members 26 are formed of a foaming resin material and the protruded members 26 pressed into the pipe portion 18 are foamed and expanded, thereby sealing an internal surface of the pipe portion 18 and an external surface of the hard resin 21.

The protruded member 26 has a slightly larger diameter than the inside diameter of the pipe portion 18.

Consequently, the protruded members 26 are pressed into the pipe portion 18 together with the hard resin 21 so that the hard resin 21 and the protruded members 26 are fixed into optional positions in the pipe portion 18.

Thus, the reinforcement element 25 including the hard resin 21 and the protruded members 26 can easily be fixed into the pipe portion 18 so that a workability can be enhanced.

Moreover, the protruded member 26 also serves as a member for fixing the hard resin 21 into the pipe portion 18. Therefore, it is not necessary to use the conventional fixing hole and clip portion. Consequently, a cost for processing the pipe portion 18 and a cost of a material can be reduced.

Figure 9A:
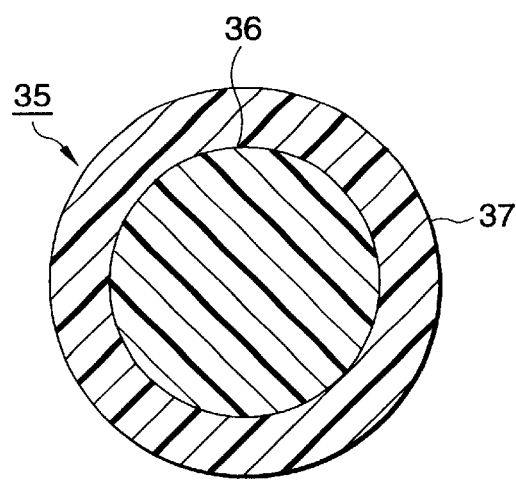
FIGS. 9A to 9C are views illustrating a reinforcement element forming a reinforcement structure of a pipe according to the invention (a second embodiment)
Figure 9B:
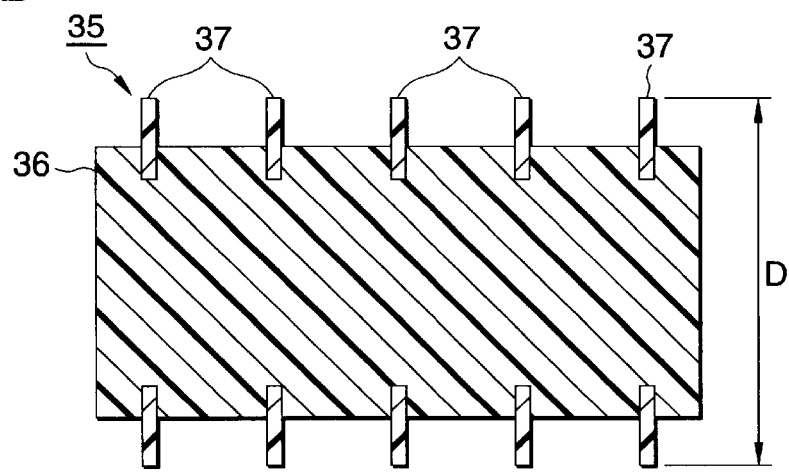
Figure 9C:
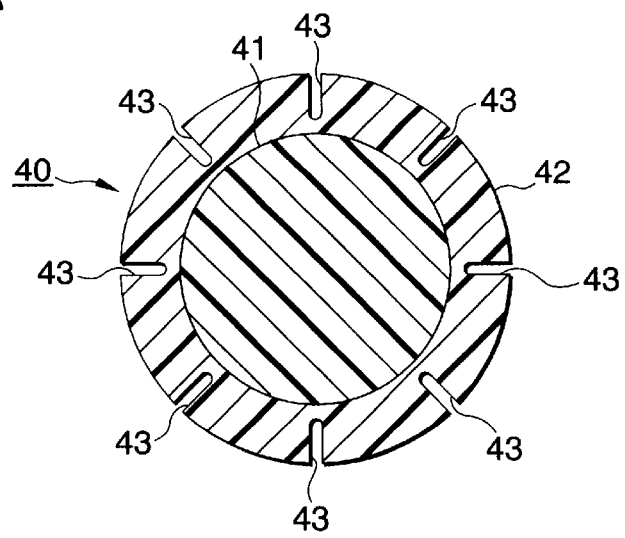

FIGS. 9A to 9C are views illustrating a reinforcement element forming a reinforcement structure of a pipe according to the invention (a second embodiment).

FIG. 9A is a cross-sectional view. A reinforcement element 35 includes a hard resin 36 to be a cylindrical core member and a flange-shaped protruded member 37 protruded from an outer peripheral surface of the hard resin 36.

FIG. 9B is a longitudinal sectional view. The reinforcement element 35 is a member obtained by integrally burying the protruded members 37 in an outer peripheral portion of the hard resin 36.

The protruded member 37 is elastic plate-shaped, and has an outside diameter D larger than the inside diameter of the pipe member 18 (see FIG. 3).

FIG. 9C shows a variant of the reinforcement element 35 described in the FIGS. 9A and 9B, and a reinforcement element 40 includes a hard resin 41 to be a core member and a flange-shaped protruded member 42 protruded from an outer peripheral surface of the hard resin 41. The protruded member 42 has elasticity and is provided with radial slits 43 . . . for easy insertion in the pipe portion 18 (see FIG. 3).

Figure 10A:
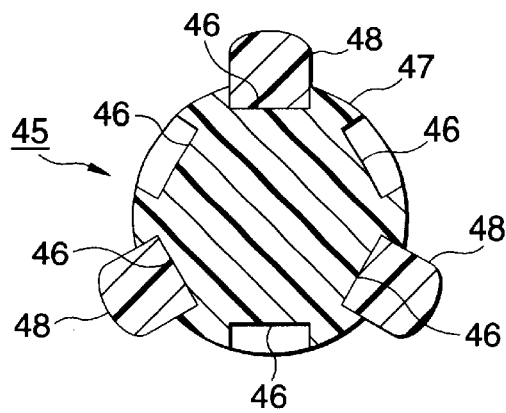
FIGS. 10A to 10C are views illustrating a reinforcement element forming a reinforcement structure of a pipe according to the invention (a third embodiment)
Figure 10B:
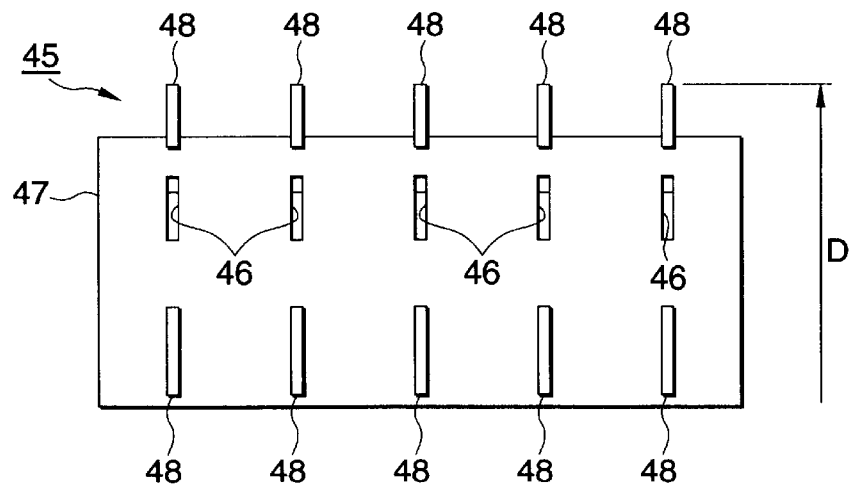
Figure 10C:
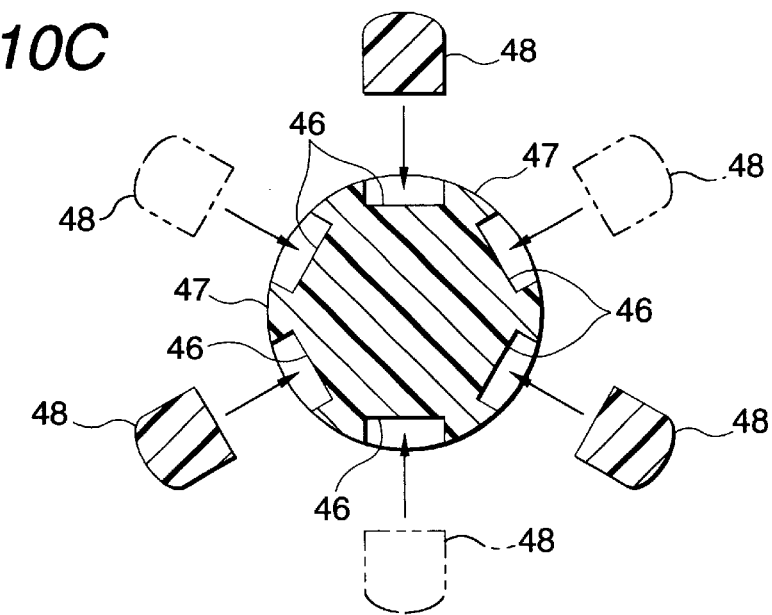

FIGS. 10A to 10C are views illustrating a reinforcement element forming a reinforcement structure of a pipe according to the invention (a third embodiment).

FIG. 10A is a cross-sectional view. A reinforcement element 45 includes a hard resin 47 to be a core member having trench portions 46 formed on an outer peripheral surface of a cylinder and protruded members 48 inserted into the trench portions 46 of the hard resin 47.

FIG. 10B is a longitudinal sectional view. The reinforcement element 45 is a member in which the protruded members 48 are arranged in a plurality of lines on an outer peripheral portion of the hard resin 47.

The protruded member 48 is elastic plate-shaped. The protruded member 48 attached to the hard resin 47 has an outside diameter D larger than the inside diameter of the pipe member 18 (see FIG. 3).

In the FIG. 10C, the protruded member 48 may be attached to the optional trench portion 46 of the hard resin 47 such that there is no hindrance to the insertion in the pipe portion 18.

Figure 11A:
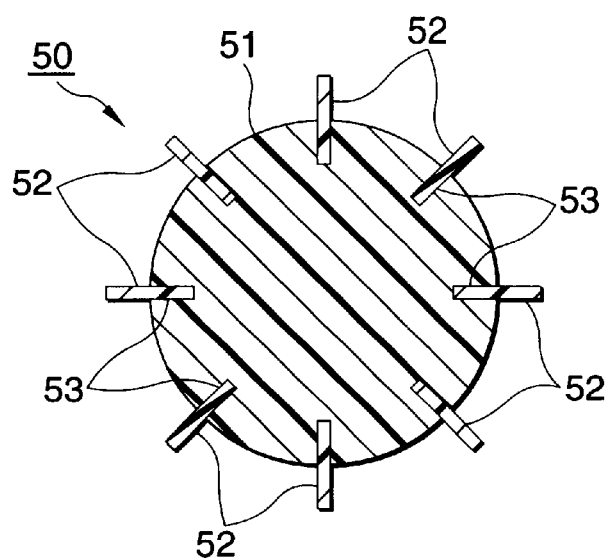
FIGS. 11A and 11B are views illustrating a reinforcement element forming a reinforcement structure of a pipe according to the invention (a fourth embodiment)
Figure 11B:
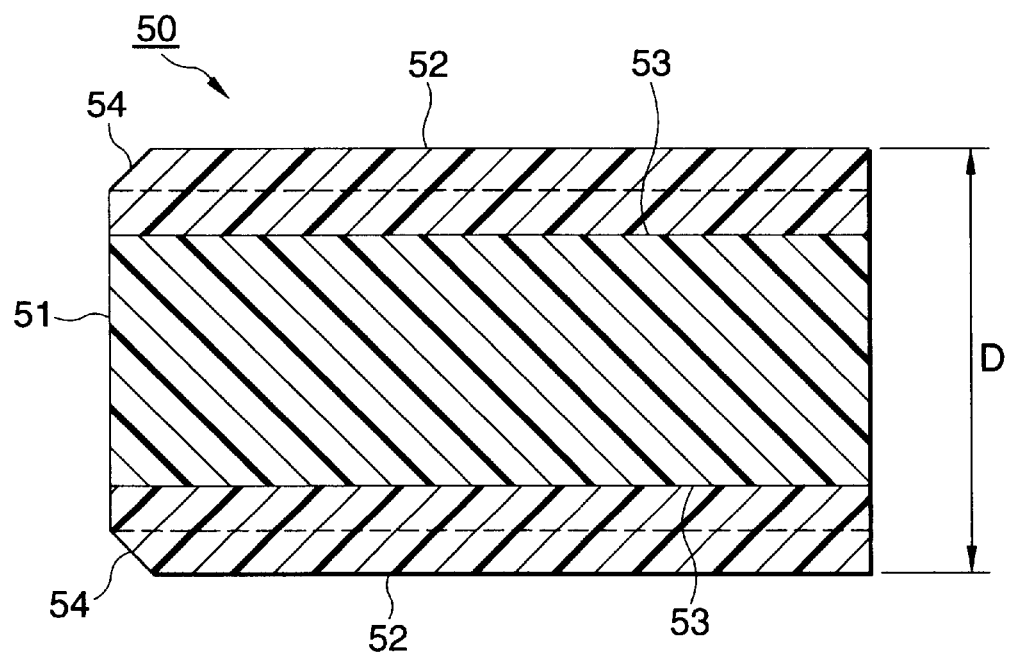

FIGS. 11A and 11B are views illustrating a reinforcement element forming a reinforcement structure of a pipe according to the invention (a fourth embodiment).

FIG. 11A is a cross-sectional view. A reinforcement element 50 includes a hard resin 51 to be a cylindrical core member and a protruded member 52 radially attached to an outer peripheral surface of the hard resin 51.

FIG. 11B is a longitudinal sectional view. The reinforcement element 50 is obtained by inserting the protruded member 52 into elongated trench portions 53 . . . formed in a longitudinal direction of the hard resin 51.

The protruded member 52 is elastic plate-shaped. The protruded member 52 attached to the hard resin 51 has an outside diameter D larger than the inside diameter of the pipe member 18 (see FIG. 3). Moreover, slant faces 54 . . . are formed on ends for easy insertion into the pipe portion 18.

The procedure for fixing the reinforcement element 50 will be described below.

Figure 12A:
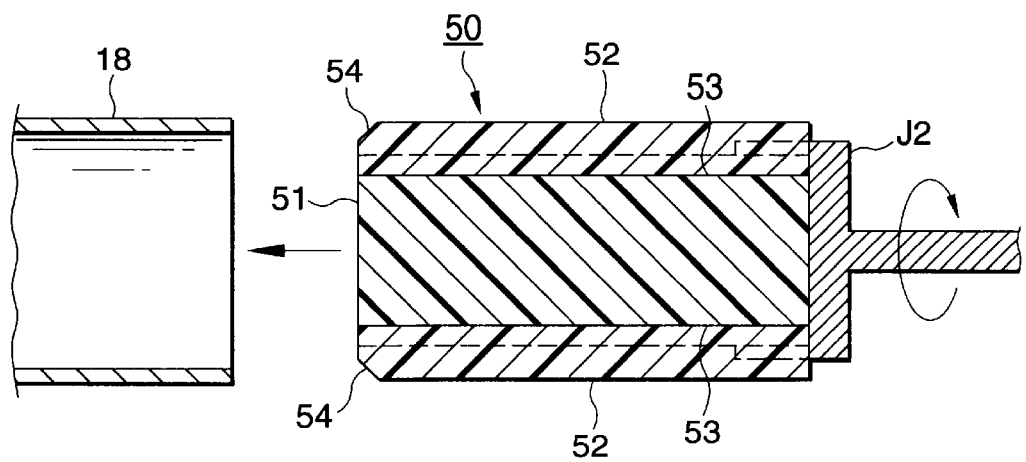
FIGS. 12A to 12C are functional views illustrating the procedure for fixing the reinforcement element forming the reinforcement structure of a pipe according to the invention (the fourth embodiment)
Figure 12B:
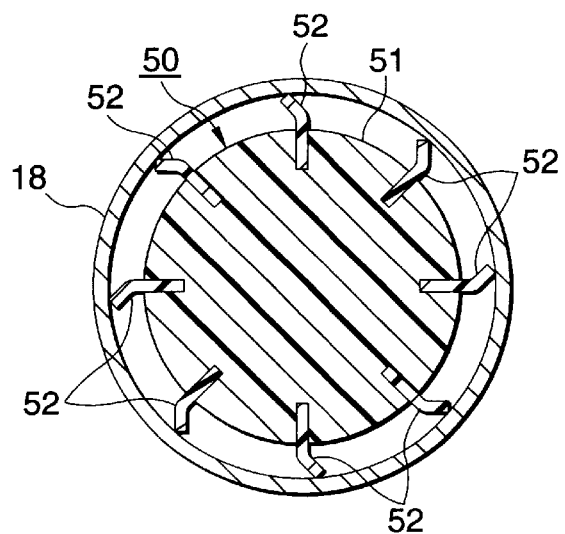
Figure 12C:
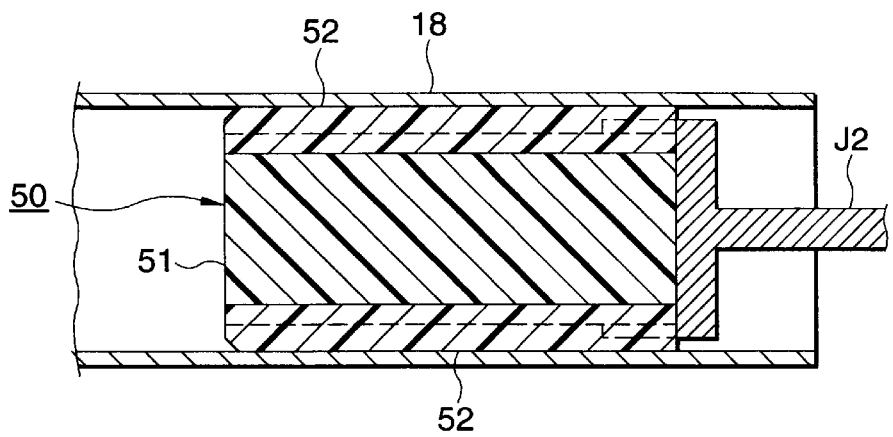

FIGS. 12A to 12C are functional views illustrating the procedure for fixing the reinforcement element forming the reinforcement structure of a pipe according to the invention (the fourth embodiment).

In FIG. 12A, the reinforcement element 50 held by a jig J2 is inserted from the end side of the pipe portion 18 into the pipe portion 18 while being rotated.

FIG. 12B shows a state in which the protruded member 52 of the reinforcement element 50 is pressed into the pipe portion 18 after the insertion into the pipe portion 18 so that it is flexed in a circumferential direction.

At this time, elastic force is generated on the protruded members 52, and the protruded members 52 are maintained to push an internal surface of the pipe portion 18.

In FIG. 12C, the reinforcement element 50 is pushed by means of the jig J2 and is moved into a predetermined position.

Thus, frictional force is generated between the internal surface of the pipe portion 18 and the protruded members 52 by the elastic force of the protruded members 52. Therefore, when the reinforcement element 50 is simply moved to the predetermined position, the reinforcement element 50 can easily be fixed into the same predetermined position.

Figure 13A:
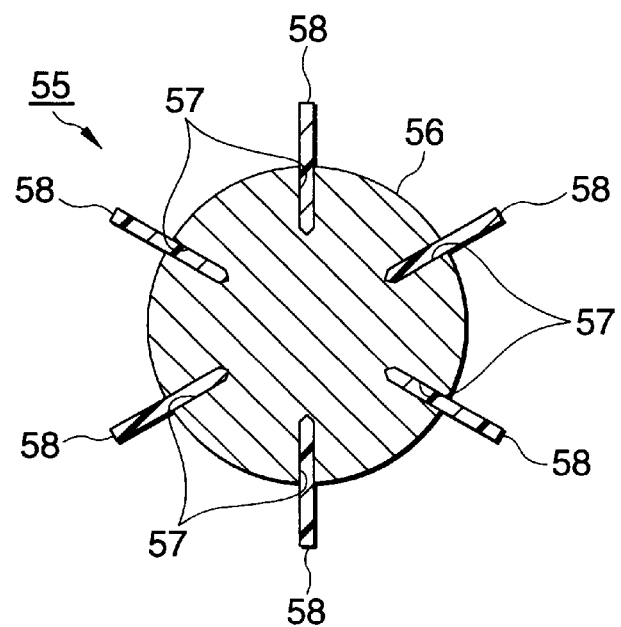
FIGS. 13A and 13B are views illustrating a reinforcement element forming a reinforcement structure of a pipe according to the invention (a fifth embodiment)
Figure 13B:
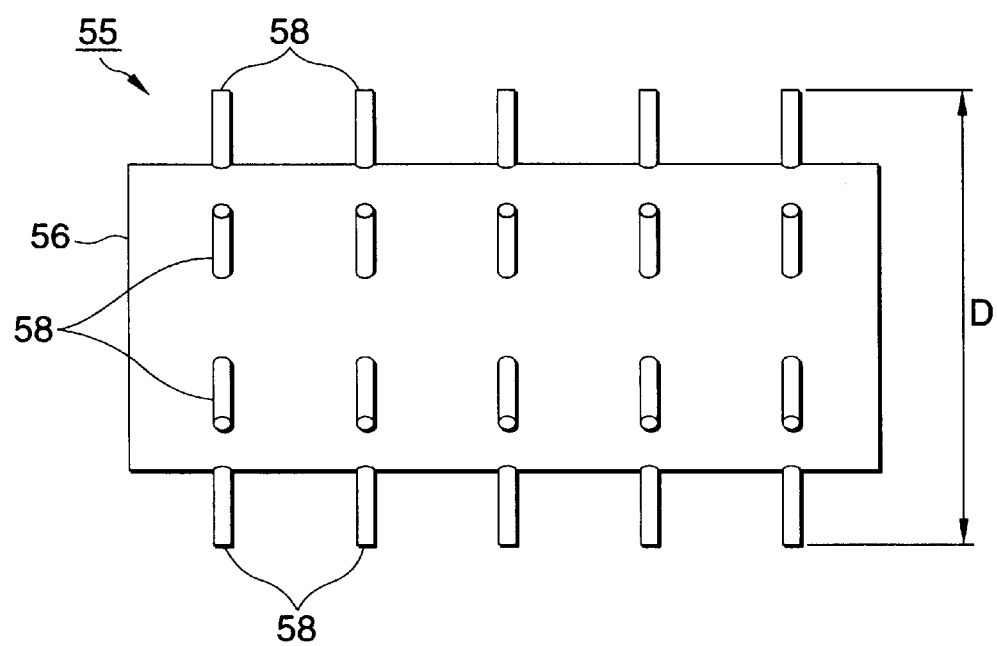

FIGS. 13A and 13B are views illustrating a reinforcement element forming a reinforcement structure of a pipe according to the invention (a fifth embodiment).

FIG. 13A is a cross-sectional view. A reinforcement element 55 includes a hard resin 56 to be a cylindrical core ember and bar-shaped protruded members 58 inserted in hole portions 57 radially provided on an outer peripheral surface of the hard resin 56.

FIG. 13B is a longitudinal sectional view. The reinforcement element 55 is a member in which the protruded members 58 are distributed like a brush hair over the whole outer peripheral surface of the hard resin 56.

The protruded member 58 has elasticity. The protruded member 58 attached to the hard resin 56 has an outer dimension D larger than the inside diameter of the pipe member 18.

Figure 14A:
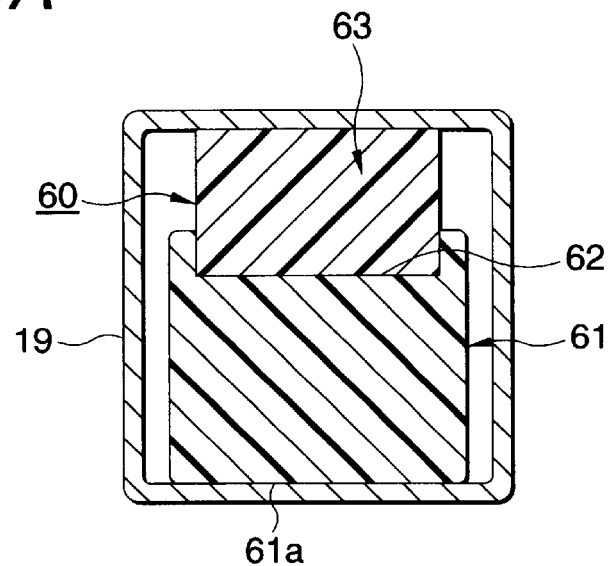
FIGS. 14A and 14B are views illustrating a reinforcement element forming a reinforcement structure of a pipe according to the invention (a sixth embodiment)
Figure 14B:
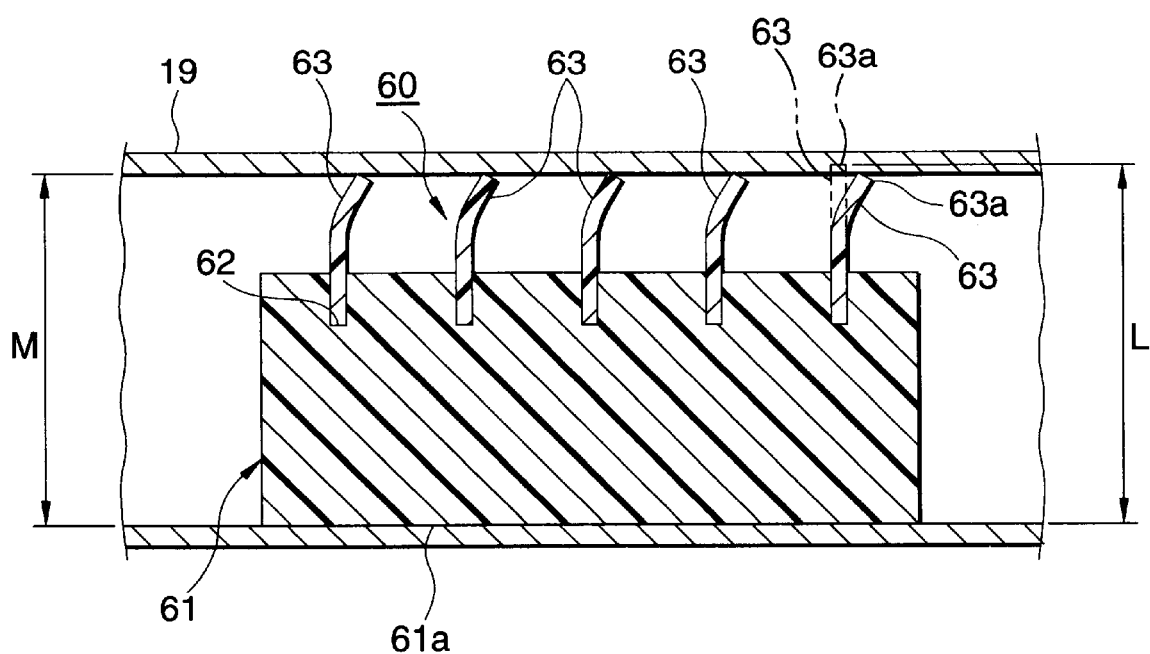
Figure 15:
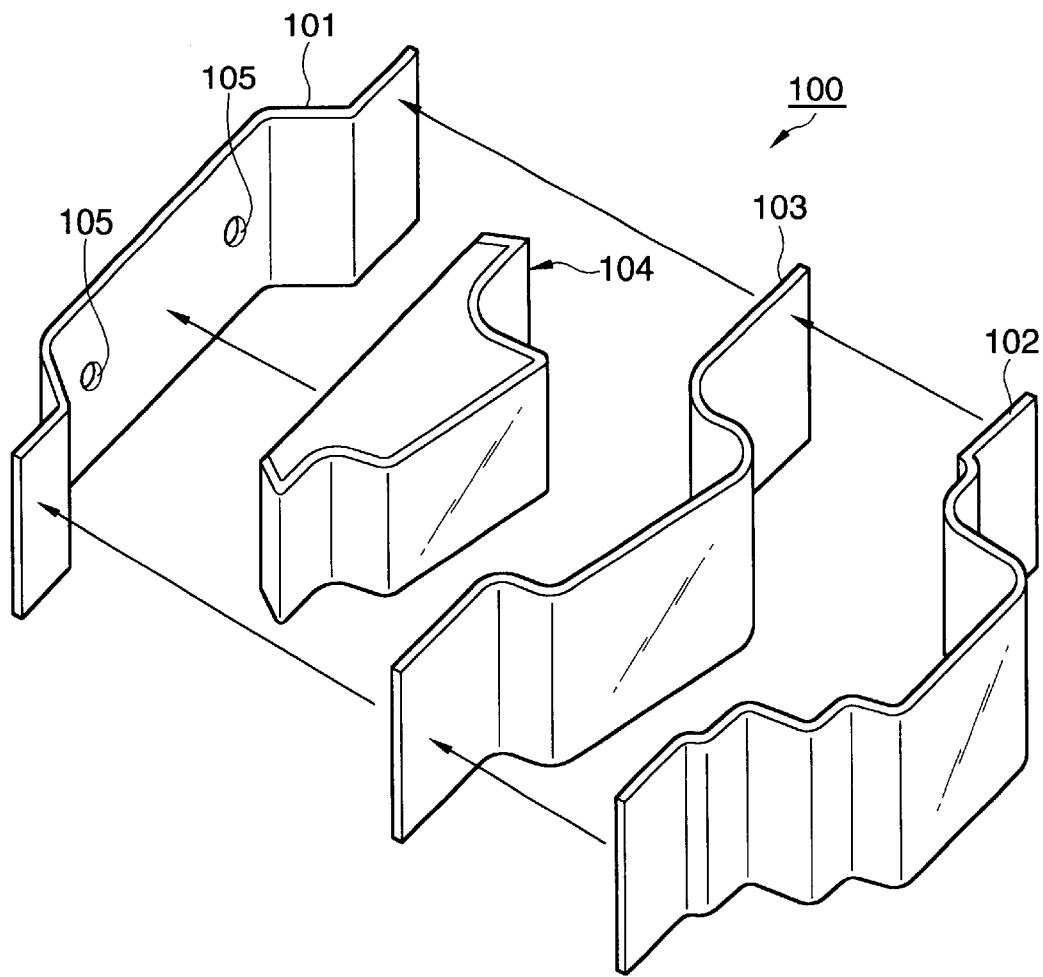
FIG. 15 is an exploded perspective view showing a reinforcement structure of a conventional closed sectional structure.
Figure 16:
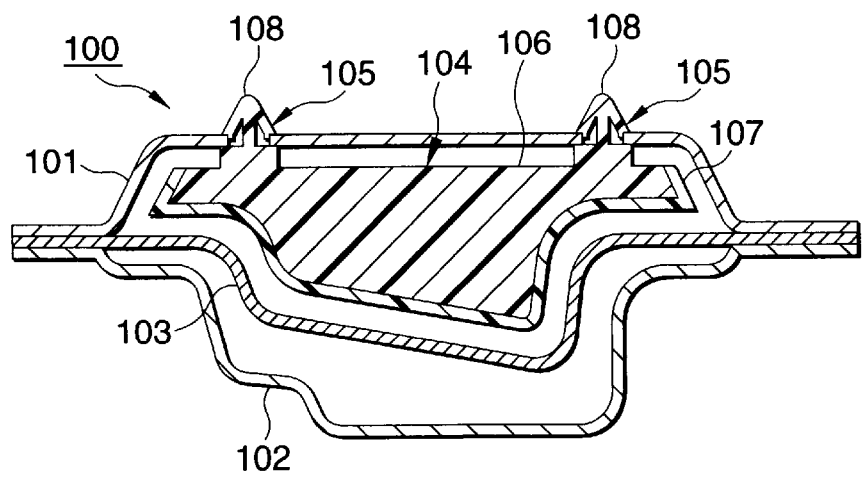
FIG. 16 is a sectional view showing a conventional center pillar.
Figure 17:
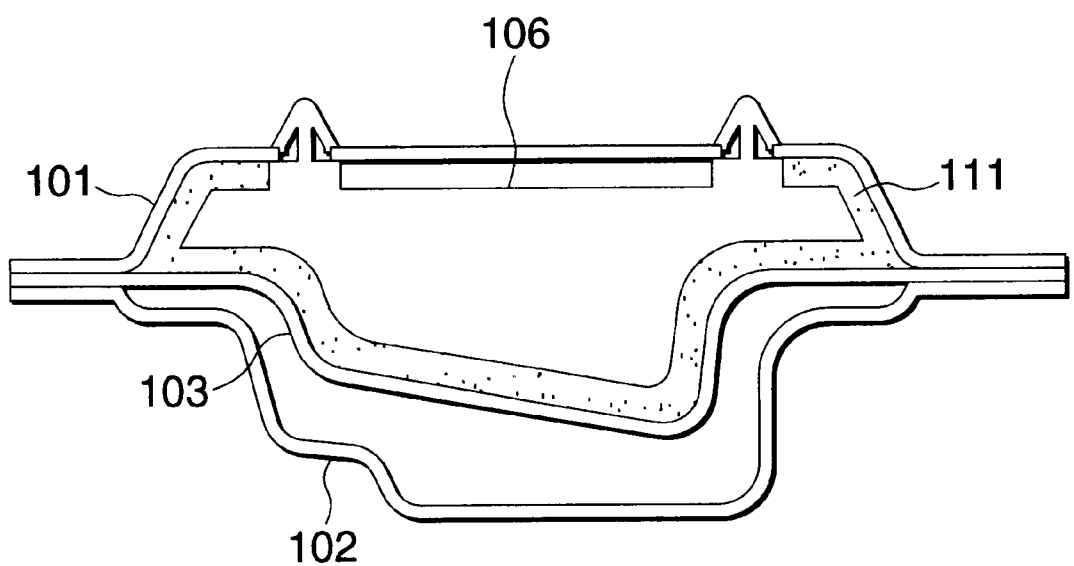
FIG. 17 is a view illustrating a state in which the conventional center pillar is reinforced.

FIGS. 14A and 14B are views illustrating a reinforcement element forming a reinforcement structure of a pipe according to the invention (a sixth embodiment).

FIG. 14A is a cross-sectional view illustrating a state in which a reinforcement element 60 is inserted into a pipe portion 19 to be prism-shaped.

The reinforcement element 60 includes a hard resin 61 to be a prismatic core member and a protruded member 63 inserted into a trench portion 62 formed on the hard resin 61. Both of a face 61a of the hard resin 61 and the protruded member 63 are pushed against an internal surface of the pipe portion 19.

In FIG. 14B, a distance L between the face 61a of the hard resin 61 and a tip 63a of the protruded member 63 which is obtained before the insertion in the pipe portion 19 is set to be greater than an inner dimension M of the pipe portion 19. Therefore, the protruded member 63 is flexed by pressing after the reinforcement element 60 is inserted into the pipe portion 19.

At this time, elastic force is generated on the protruded member 63 to press the internal surface of the pipe portion 19. Consequently, frictional force is generated between the protruded member 63 and the internal surface of the pipe portion 19. Thus, the reinforcement element 60 can be fixed into the pipe portion 19 by the frictional force easily and reliably.

Moreover, when the face 61a of the hard resin 61 is pushed against the internal surface of the pipe portion 19, rigidity of a wall of the pipe portion 19 on the face 61a side can particularly be increased and external force acting on the wall can be supported fully, for example.

Accordingly, the rigidity of each part of the pipe portion 19 can be tuned depending on the conditions of use of the pipe portion 19.

Furthermore, the protruded member 63 is provided on only one side of the hard resin 61. Consequently, the shape of a metal mold for forming the reinforcement element 60 can be simplified. Thus, a cost of the metal mold can be reduced.

The core member and the protruded member according to the invention may be formed of separate members (different materials) or may be formed of the same foaming resin material integrally.

If they are formed of the separate members, one of the core member and the protruded member may be formed of the foaming resin material. If they are formed of the same foaming resin material, the protruded member may be attached to the core member.

Moreover, in the case in which a plurality of protruded members are to be protruded from the core member, some of them may be formed of separate members (different materials) from the core member and the other protruded members may be formed of the same member (the same material) as that of the core member.

Furthermore, the core member is not restricted to the hard resin but may be a light metal such as a soft resin or an aluminum alloy.

Moreover, the core member is not restricted to the cylindrical shape but may take a shape of a triangular prism, a square prism and a polygonal prism.

The invention has the following effects by the structure.

The reinforcement structure of a pipe according to the first aspect of the invention comprises a core member to be inserted into a pipe to be reinforced and a protruded member protruded from the core member and having a slightly larger diameter than an inside diameter of the pipe. Therefore, the protruded members can be pressed into the pipe together with the core member and the core member and the protruded member can be fixed into optional positions in the pipe.

Thus, the core member and the protruded member can easily be fixed into the pipe so that a workability can be enhanced.

Moreover, it is not necessary to use the fixing hole and the clip portion which serve to fix the core member and the protruded member into the pipe. Consequently, it is possible to reduce a cost for processing a pipe and a cost of a material.

In the reinforcement structure of a pipe according to the second aspect of the invention, the core member and the protruded member are formed of the same foaming resin material integrally. Therefore, an integral product of the core member and the protruded member can easily be formed so that a manufacturing cost of the integral product can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A reinforcement structure of a pipe comprising:
   a core member which is inserted into said pipe; and
   a protruded member which is protruded from said core member and have a slightly larger diameter than an inside diameter of said pipe,
   wherein at least one of said core member or said protruded member is formed of a foaming resin material, and
   wherein at least one of said core member or protruded member being pressed into said pipe is foamed and expanded to seal between an internal surface of said pipe and an external surface of at least one of said core member or said protruded member.

2. The reinforcement structure of a pipe according to claim 1, wherein said core member and said protruded member are formed of the same foaming resin material integrally.

3. The reinforcement structure of a pipe according to claim 1, wherein said protruded member is plate-shaped.

4. The reinforcement structure of a pipe according to claim 1, wherein said protruded member is flange-shaped.

5. The reinforcement structure of a pipe according to claim 1, wherein said core member comprises a plurality of trench portions into which said protruded member is inserted.

6. The reinforcement structure of a pipe according to claim 1, wherein said protruded member is bar-shaped.

* * * * *